US012793469B2

(12) United States Patent
Chen et al.

(10) Patent No.: US 12,793,469 B2
(45) **Date of Patent: *Nov. 10, 2026**

(54) AUDIOVISUAL DEEPFAKE DETECTION

(71) Applicant: Pindrop Security, Inc., Atlanta, GA (US)

(72) Inventors: Tianxiang Chen, Atlanta, GA (US); Elie Khoury, Atlanta, GA (US)

(73) Assignee: Pindrop Security, Inc., Atlanta, GA (US)

( * ) Notice: Subject to any disclaimer, the term of this patent is extended or adjusted under 35 U.S.C. 154(b) by 195 days.

This patent is subject to a terminal disclaimer.

(21) Appl. No.: 18/919,049

(22) Filed: Oct. 17, 2024

(65) Prior Publication Data

US 2025/0037507 A1 Jan. 30, 2025

Related U.S. Application Data

(63) Continuation of application No. 17/503,152, filed on Oct. 15, 2021, now Pat. No. 12,142,083.

(Continued)

(51) Int. Cl.
*G06V 40/40* (2022.01)
*G06F 18/21* (2023.01)
(Continued)

(52) U.S. Cl.
CPC .............. *G06V 40/40* (2022.01); *G06F 18/21* (2023.01); *G06F 18/22* (2023.01); *G06V 20/49* (2022.01);
(Continued)

(58) Field of Classification Search
CPC ......... G06F 18/21; G06F 18/22; G06V 20/49; G06V 40/168; G06V 40/171; G06V 40/20;
(Continued)

(56) References Cited

U.S. PATENT DOCUMENTS

| | | | |
|---|---|---|---|
| 9,824,692 | B1 | 11/2017 | Khoury et al. |
| 10,141,009 | B2 | 11/2018 | Khoury et al. |

(Continued)

FOREIGN PATENT DOCUMENTS

| | | |
|---|---|---|
| EP | 3 156 978 | 4/2017 |
| EP | 3 842 969 A1 | 6/2021 |

(Continued)

OTHER PUBLICATIONS

Office Action issued in Japanese Patent Application No. 2023-523075 dated Sep. 1, 2025.

(Continued)

*Primary Examiner* — Michael J Vanchy, Jr.
(74) *Attorney, Agent, or Firm* — Foley & Lardner LLP

(57) ABSTRACT

The embodiments execute machine-learning architectures for biometric-based identity recognition (e.g., speaker recognition, facial recognition) and deepfake detection (e.g., speaker deepfake detection, facial deepfake detection). The machine-learning architecture includes layers defining multiple scoring components, including sub-architectures for speaker deepfake detection, speaker recognition, facial deepfake detection, facial recognition, and lip-sync estimation engine. The machine-learning architecture extracts and analyzes various types of low-level features from both audio data and visual data, combines the various scores, and uses the scores to determine the likelihood that the audiovisual data contains deepfake content and the likelihood that a claimed identity of a person in the video matches to the identity of an expected or enrolled person. This enables the machine-learning architecture to perform identity recognition and verification, and deepfake detection, in an integrated fashion, for both audio data and visual data.

20 Claims, 8 Drawing Sheets

Related U.S. Application Data

(60) Provisional application No. 63/092,956, filed on Oct. 16, 2020.

(51) Int. Cl.
*G06F 18/22* (2023.01)
*G06V 20/40* (2022.01)
*G06V 40/16* (2022.01)
*G06V 40/70* (2022.01)
*G10L 17/22* (2013.01)

(52) U.S. Cl.
CPC ............ *G06V 40/168* (2022.01); *G06V 40/70* (2022.01); *G10L 17/22* (2013.01)

(58) Field of Classification Search
CPC ........ G06V 40/40; G06V 40/70; G10L 17/10; G10L 17/22
See application file for complete search history.

(56) References Cited

U.S. PATENT DOCUMENTS

| | | | | |
|---|---|---|---|---|
| 12,142,083 | B2* | 11/2024 | Chen | G06V 40/40 |
| 2017/0351487 | A1 | 12/2017 | Vaquero et al. | |
| 2018/0121639 | A1 | 5/2018 | Liu et al. | |
| 2018/0130475 | A1 | 5/2018 | Page et al. | |
| 2018/0254046 | A1* | 9/2018 | Khoury | G10L 17/02 |
| 2020/0035247 | A1 | 1/2020 | Boyadjiev et al. | |
| 2020/0134148 | A1* | 4/2020 | Mortazavian | G06F 17/16 |
| 2020/0226397 | A1 | 7/2020 | He et al. | |
| 2020/0285683 | A1 | 9/2020 | David | |
| 2020/0309930 | A1 | 10/2020 | Zhou et al. | |
| 2021/0233541 | A1 | 7/2021 | Chen et al. | |
| 2021/0327431 | A1 | 10/2021 | Stewart et al. | |
| 2025/0037506 | A1* | 1/2025 | Chen | G06V 40/40 |
| 2025/0037507 | A1 | 1/2025 | Chen et al. | |

FOREIGN PATENT DOCUMENTS

| | | | |
|---|---|---|---|
| JP | 2001-338295 | A | 12/2001 |
| JP | 2018-524072 | A | 8/2018 |
| WO | WO-2014/132570 | A1 | 9/2014 |

OTHER PUBLICATIONS

Cao et al., "Vggface2: A Dataset for Recognizing Faces across Pose and Age", 13th IEEE International Conference on Automatic Face & Gesture Recognition, IEEE, 2018, pp. 67-74, DOI: 10.1109/FG.2018.00020 (11 pages).

Chung et al., "Out of Time: Automated Lip Sync in the Wild", Workshop on Multi-view Lip-Reading, ACCV, 2016, DOI: 10.1007/978-3-319-54427-4_19 (15 pages).

Final Office Action on U.S. Appl. No. 17/503,152, dated Nov. 9, 2023.

International Preliminary Report on Patentability for PCT App. PCT/US2021/055267 dated Apr. 13, 2023 (6 pages).

International Search Report and Written Opinion for PCT/US2021/055267 dated Jan. 31, 2022 (11 pages).

International Search Report and Written Opinion issued in International Application No. 21881214.7-1207 | 4229626 PCT/US202105526 dated Sep. 10, 2024 (8 Pages).

Lewis John Ket al: "Deepfake Video Detection Based on Spatial, Spectral, and Temporal Inconsistencies Using Multimodal Deep Learning", 2020 IEEE Applied Imagery Pattern Recognition Workshop (AIPR), IEEE, Oct. 13, 2020 (Oct. 13, 2020), pp. 1-9, XP033913559, DOI: 10.1109/AIPR50011.2020.9425167.

Non-Final Office Action on U.S. Appl. No. 17/503,152, dated Mar. 8, 2024.

Non-Final Office Action on U.S. Appl. No. 17/503,152 dated Mar. 30, 2023 (15 pages).

Notice of Allowance on U.S. Appl. No. 17/503,152, dated Jul. 1, 2024.

Pitie et al., "Assessment of Audio/Visual Synchronization in Streaming Media", 2014 Sixth International Workshop on Quality of Multimedia Experience (QoMEX), IEEE, 2014, pp. 171-176, DOI: 10.1109/QoMEX.2014.6982315 (6 pages).

Wild Peter et al: "Robust multimodal face and fingerprint fusion in the presence of spoofing attacks", Pattern Recognition, vol. 50, Aug. 19, 2015 (Aug. 19, 2015), pp. 17-25, P029318499, ISSN: 0031-3203, DOI: 10.1016/J.PATCOG.2015.08.007.

Office Action issued in corresponding Korean Patent Application No. 10-2023-7015335 dated Mar. 3, 2026.

Notice of Allowance for U.S. Appl. No. 18/918,928, dated Jun. 25, 2026.

* cited by examiner

AUDIOVISUAL DEEPFAKE DETECTION

CROSS-REFERENCE TO RELATED APPLICATIONS

This application is a continuation application of U.S. application Ser. No. 17/503,152, filed Oct. 15, 2021, which claims priority to U.S. Provisional Application No. 63/092,956, filed Oct. 16, 2020, each of which is incorporated by reference in its entirety.

This application generally relates to U.S. application Ser. No. 15/262,748, issued as U.S. Pat. No. 9,824,692, entitled "End-to-End Speaker Recognition Using Deep Neural Network," filed Sep. 12, 2016, which is incorporated by reference in its entirety.

This application generally relates to U.S. application Ser. No. 17/155,851, entitled "Robust spoofing detection system using deep residual neural networks," filed Aug. 21, 2020, which is incorporated by reference in its entirety.

This application generally relates to U.S. application Ser. No. 15/610,378, issued as U.S. Pat. No. 10,141,009, entitled System and Method for Cluster-Based Audio Event Detection," filed May 31, 2017, which is incorporated by reference in its entirety.

TECHNICAL FIELD

This application generally relates to systems and methods for managing, training, and deploying a machine learning architecture for audio processing.

BACKGROUND

Deepfakes of manipulated audiovisual data are becoming increasingly commonplace and sophisticated. This permits proliferation of videos of individuals across social media websites and video-sharing platforms. Fraudsters, pranksters, or other bad actors could employ deepfakes to damage a person's reputation or disrupt interpersonal discourse by publishing false and/or misattributed information about a person shown in the spoofed video. Another problem arises in communications or computing systems that rely upon audiovisual data for authenticating users or verifying user activities. Deepfakes could be employed by fraudsters or other bad actors to spoof the identity of a particular authorized access system features.

"Deepfake" refers to a manipulated video content, audio content, or any other digital format generated by artificial intelligent algorithms capable of producing sophisticated and believable spoofs of a person's image and/or voice. The algorithms often generate audio and/or visual content that appear genuine. Due to the recent improvements in deepfake algorithms, deepfake videos and audios are becoming extremely sophisticated and, in some cases, nearly or entirely indistinguishable by humans. These fake videos and audios pose a great threat to social media platforms as the deepfakes may manipulate factual discourse and used to make people believe fake news is real or damage a person's reputation. Improvements to deepfake detection and biometric recognition systems would be beneficial in any number of circumstances.

SUMMARY

Many conventional deepfake detection systems focus on detecting deepfake content in either audio utterances or facial images. These deepfake detection systems may only evaluate and secure one form of data (e.g., audio or visual) at a time, potentially requiring additional computing resources to separately evaluate audio data from visual data and potentially failing to detect deepfakes. What is needed is a means for evaluating audio data, visual data, and/or audiovisual data using a consolidated system of one or more integrated machine-learning architectures.

Disclosed herein are systems and methods capable of addressing the above-described shortcomings and may also provide any number of additional or alternative benefits and advantages. Embodiments include a computing device that executes software routines for one or more machine-learning architectures. The machine-learning architecture executes integrated evaluation operations for audio and visual deepfake detections to evaluate and secure audio data, visual data, and audiovisual data. Additionally, this combination increases the overall accuracy of the deepfake detection system.

The embodiments disclosed herein include the systems and methods executing machine-learning architectures for biometric-based identity recognition (e.g., speaker recognition, facial recognition) and deepfake detection (e.g., speaker deepfake detection, facial deepfake detection). The machine-learning architecture includes layers defining multiple scoring components, including sub-architectures for speaker deepfake detection (generating a speaker deepfake score), speaker recognition (generating a speaker-recognition similarity score), facial deepfake detection (generating a facial deepfake score), facial recognition (generating a facial-recognition similarity score), and lip-sync estimation engine (generating a lip-sync estimation score). The machine-learning architecture extracts and analyzes various types of low-level features from both audio data and visual data of a given video (audiovisual data sample), combines the various scores generated by the scoring components, and uses the various scores to determine the likelihood that the audiovisual data contains deepfake content and the likelihood that a claimed identity of a person in the video matches to the identity of an expected or enrolled person. This enables the machine-learning architecture to perform identity recognition and verification, and deepfake detection, in an integrated fashion, for both audio data and visual data.

In an embodiment, a computer-implemented method comprises obtaining, by a computer, an audiovisual data sample containing audiovisual data; applying, by the computer, a machine-learning architecture to the audiovisual data to generate a similarity score using a biometric embedding extracted from the audiovisual data and generate a deepfake score using a spoofprint extracted from the audiovisual data; and generating, by the computer, a final output score indicating a likelihood that the audiovisual data is genuine using the similarity score and the deepfake score.

In another embodiment, a computer comprises a processor configured to: obtain an audiovisual data sample containing audiovisual data; apply a machine-learning architecture to the audiovisual data to generate a similarity score using a biometric embedding extracted from the audiovisual data and generate a deepfake score using a spoofprint extracted from the audiovisual data; and generate a final output score indicating a likelihood that the audiovisual data is genuine using the similarity score and the deepfake score.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
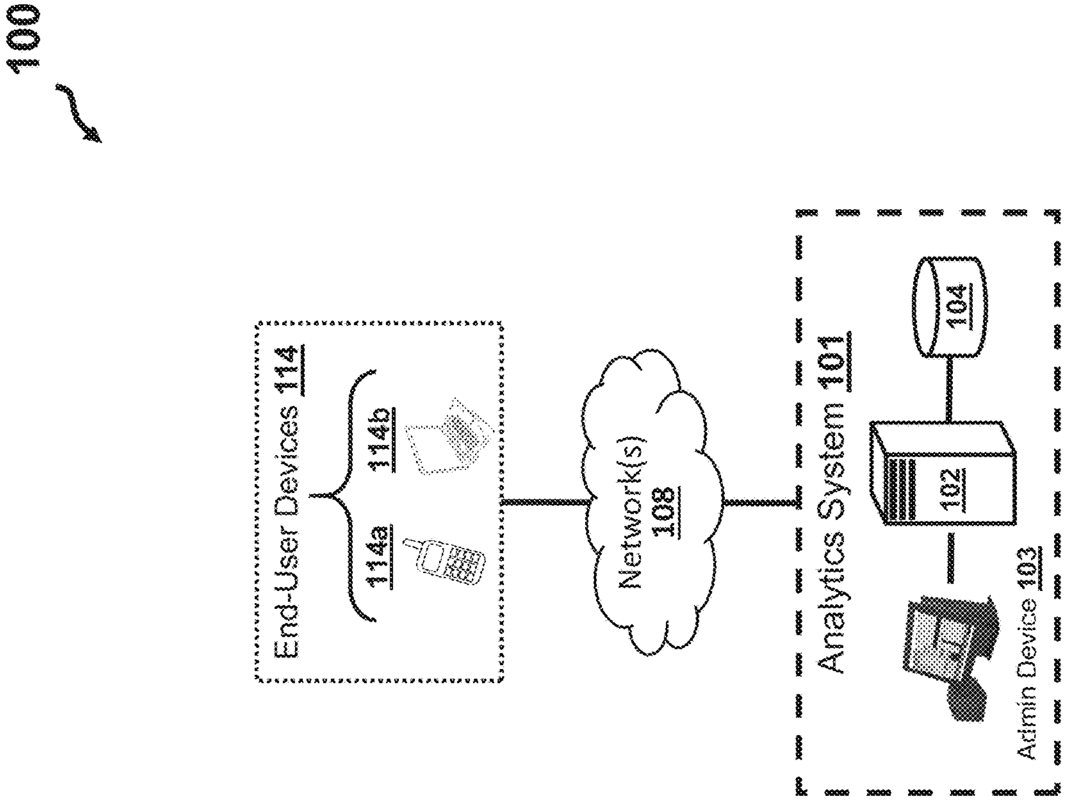
FIG. 1 shows components of a system for receiving and analyzing audiovisual data.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Many conventional deepfake detection systems focus on detecting deepfake content in either an audio utterance or face image. These systems are effective, but can only detect deepfakes (or spoofs) in one type of data—audio data or image data—though data streams or computer files often include audiovisual data having both audio and visual components. Thus, conventional approaches are often insufficient or inefficient. Embodiments disclosed here herein include a computing device executing software for one or more machine-learning architectures, where the machine-learning architecture executes integrated analysis operations for audio and visual deepfake detections to evaluate audio data, visual data, and audiovisual data.

The embodiments disclosed herein include the systems and methods executing machine-learning architectures for biometric-based identity recognition (e.g., speaker recognition, facial recognition) and deepfake detection (e.g., speaker deepfake detection, facial deepfake detection). The machine-learning architecture includes layers defining multiple scoring components, including sub-architectures for speaker deepfake detection (generating a speaker deepfake score), speaker recognition (generating a speaker-recognition similarity score), facial deepfake detection (generating a facial deepfake score), facial recognition (generating a facial-recognition similarity score), and lip-sync estimation engine (generating a lip-sync estimation score). The machine-learning architecture extracts and analyzes various types of low-level features from both audio data and visual data of a given video (audiovisual data sample), combines the various scores generated by the scoring components, and uses the various scores to determine the likelihood that the audiovisual data contains deepfake content and the likelihood that a claimed identity of a person in the video matches to the identity of an expected or enrolled person. This enables the machine-learning architecture to perform identity recognition and verification, and deepfake detection, in an integrated fashion, for both audio data and visual data.

FIG. 1 shows components of a system 100 for receiving and analyzing audiovisual data. The system 100 comprises an analytics system 101 and end-user devices 114. The analytics system 101 includes analytics servers 102, analytics databases 104, and admin devices 103. Embodiments may comprise additional or alternative components or omit certain components from those of FIG. 1, and still fall within the scope of this disclosure. It may be common, for example, to include multiple analytics servers 102. Embodiments may include or otherwise implement any number of devices capable of performing the various features and tasks described herein. For example, FIG. 1 shows the analytics server 102 as a distinct computing device from the analytics database 104. In some embodiments, the analytics database 104 includes an integrated analytics server 102. In operation, the analytics server 102 receives and processes audiovisual data from the end-user devices 114 to recognize a speaker's voice and face in a video and/or detect whether the video contains a deepfake of the speaker's voice or facial image. The analytics server 102 outputs a score or indication of whether the audiovisual input likely contains cither genuine or spoofed audiovisual data.

The system 100 comprises various hardware and software components of one or more public or private networks 108 interconnecting the various components of the system 100. Non-limiting examples of such networks 108 may include Local Area Network (LAN), Wireless Local Area Network (WLAN), Metropolitan Area Network (MAN), Wide Area Network (WAN), and the Internet. The communication over the networks 108 may be performed in accordance with various communication protocols, such as Transmission Control Protocol and Internet Protocol (TCP/IP), User Datagram Protocol (UDP), and IEEE communication protocols. Likewise, the end-user devices 114 may communicate with the analytics system 101 or other customer-facing systems via telephony and telecommunications protocols, hardware, and software capable of hosting, transporting, and exchanging audiovisual data (e.g., computer files, data stream). Non-limiting examples of telecommunications and/or computing networking hardware may include switches and trunks, among other additional or alternative hardware used for hosting, routing, or managing data communication, circuits, and signaling via the Internet or other device communications medium.

The analytics system 101 represents a computing network infrastructure comprising physically and logically related software and electronic devices managed or operated by an enterprise organization hosting a particular service (e.g., teleconference software). The devices of network system infrastructure 101 provide the intended services of the particular enterprise organization and may communicate via one or more internal networks. In some embodiments, the analytics system 101 operates on behalf of an intermediate computing network infrastructure of third party, customer-facing enterprises (e.g., companies, government entities, universities). In such embodiments, the third-party infrastructure includes computing devices (e.g., servers) that capture, store, and forward the audiovisual data to the analytics system 101. The analytics server 102 hosts a cloud-based service or communicates with a server hosting the cloud-based service.

The end-user device 114 may be any communications or computing device that the end-user operates to transmit the audiovisual data to a particular destination (e.g., the analytics system 101, customer-facing system). The end-user device 114 includes a processor and software for transmitting the audiovisual data to the analytics system 101 via the one or more networks 108. In some cases, the end-user device 114 includes software and hardware for generating the audiovisual data, including a camera and microphone. Non-limiting examples of end-user devices 114 may include mobile devices 114*a* (e.g., smartphones, tablets) and end-user computers 114*b* (e.g., laptops, desktops, servers). For instance, the end-user device 114 may be an end-user computer 114*b* executing teleconference software that captures and transmits audiovisual to a central host server that functions as, or is in communication with, the analytics server 102.

The analytics server 102 of the call analytics system 101 may be any computing device comprising one or more processors and software, and capable of performing the various processes and tasks described herein. The analytics server 102 receives and processes the audiovisual data transmitted from the end-user devices 114 or as received from the analytics database 104 during training. The analytics server 102 may host or be in communication with the analytics database 104 containing various types of information that the analytics server 102 references or queries when executing the layers of the machine-learning architecture. The analytics database 104 may store, for example, enrolled audiovisual profiles for enrolled people (e.g., enrolled users, celebrities) and trained models of the machine-learning architecture, among other types of information. Although FIG. 1 shows only single analytics server 102, the analytics server 102 may include any number of computing devices. In some cases, the computing devices of the analytics server 102 may perform all or sub-parts of the processes and benefits of the analytics server 102. The analytics server 102 may comprise computing devices operating in a distributed or cloud computing configuration and/or in a virtual machine configuration. It should also be appreciated that, in some embodiments, functions of the analytics server 102 may be partly or entirely performed by various computing devices of the analytics system 101 or other computing infrastructure.

The analytics server 102 receives the audiovisual data in a data stream, which may include a discrete computer file or continuous stream containing the audiovisual data. In some cases, the analytics server 102 receives the audiovisual data from the end-user device 114 or third-party device (e.g., webserver, third-party server of a computing service). For example, the end-user device 114 transmits a multimedia computer file containing the audiovisual data (e.g., MP4 file, MOV file) or a hyperlink to a third-party server hosting the audiovisual data (e.g., YouTube® server). In some cases, the analytics server 102 receives the audiovisual data as generated and distributed by a server hosting audiovisual communication software. For example, two or more end-user devices 114 execute the communication software (e.g., Skype®, MS Teams®, Zoom®) that establish a communications event session between the end-user devices 114 directly, or indirectly by the server that establishes and hosts the communication event session. The communication software executed by the end-user devices 114 and the server captures, stores, and distributes the audiovisual data between the end-user devices 114 in communication with the communication event session.

In some embodiments, the analytics server 102 or a third-party server of the third-party infrastructure hosts the cloud-based, audiovisual communication service. Such software execute processes for managing device communication queues for the end-user devices 114 involved with a particular device communication event session (e.g., teleconference, video call), and/or routing data packets for the device communications containing the audiovisual data between the end-user devices 114 over the one or more networks 108, among other potential software operations. The audiovisual communication software executed by the particular server (e.g., analytics server 102, third-party server) may capture, query, or generate various types of information about the end-user devices 114 and/or the end-users. When executed by a third-party server, the third-party server transmits the audiovisual data and other types of information to the analytics server 102.

The analytics server 102 executes analytics software for processing the audiovisual data samples (e.g., computer file, machine-readable data stream). The input audiovisual data includes audio data representing a speaker's audio signal and visual image data including a facial image of a particular person. The analytics server 102 processing software includes machine-learning software routines organized as various types of machine-learning architectures or models, such as a Gaussian Mixture Matrix (GMM), neural network (e.g., convolutional neural network (CNN), deep neural network (DNN)), and the like. The machine-learning architecture comprises functions or layers that perform the various processing operations discussed herein. For instance, the analytics software includes one or more machine-learning architectures for speaker and facial identification, and speaker and facial spoofing detection. The layers and operations of the machine-learning architecture define components of the machine-learning architecture, which may be separate architectures or sub-architectures. The components may include various types of machine-learning techniques or functions, such as neural network architectures or Gaussian mixture models (GMMs), among others.

The machine-learning architecture operates in several operational phases, including a training phase, an optional enrollment phase, and a deployment phase (sometimes referred to as a "test" phase or "testing"). The input audiovisual data processed by the analytics server 102 may include training audiovisual data, training audio signals, training visual data, enrollment audiovisual data, enrollment audio signals, enrollment visual data, and inbound audiovisual data received and processed during the deployment phase. The analytics server 102 applies the machine-learning architecture to each of the types of input audiovisual data during the corresponding operational phase.

The analytics server 102 or other computing device of the system 100 (e.g., call center server 111) can perform various pre-processing operations and/or data augmentation operations on the input audiovisual data. Non-limiting examples of the pre-processing operations include extracting low-level features from an audio signal or image data, parsing and segmenting the audio signal or image data into frames and segments and performing one or more transformation functions, such as Short-time Fourier Transform (SFT) or Fast Fourier Transform (FFT), among other potential pre-processing operations. The analytics server 102 may perform the pre-processing or data augmentation operations before feeding the input audiovisual data into input layers of the machine-learning architecture or the analytics server 102 may execute such operations as part of executing the machine-learning architecture, where the input layers (or other layers) of the machine-learning architecture perform these operations. For instance, the machine-learning architecture may comprise in-network pre-processing or data augmentation layers that perform certain pre-processing or data augmentation operations on the input audiovisual data.

The machine-learning architecture includes layers defining components of a audiovisual deepfake detection architecture. The layers define engines for scoring aspects of the audiovisual data, including audio spoof detection (or "audio deepfake" detection), speaker recognition, facial spoof detection (or "facial deepfake" detection), facial recognition, and lip-sync estimation. The components of the machine-learning architecture include, for example, a speaker recognition engine, a speaker deepfake engine, a facial recognition engine, a facial deepfake engine, and, in some embodiments, a lip-sync estimation engine. The machine-learning architecture analyzes both the audio signals and the image data of the audiovisual data by applying these scoring engines to the various types of audiovisual data, generates certain types of scores, combines the scores, and determines whether the audiovisual data includes deepfake components.

Speaker Engine

The machine-learning architecture includes layers defining one or more speaker-embedding engines (sometimes referred to as "speaker biometric engines" or "speaker engines"), including a speaker recognition engine and a speaker deepfake detection engine.

The speaker recognition engine extracts a set of audio features from the audio data or segments of the audio data. The features may include, for example, spectro-temporal features, including mel frequency cepstral coefficients (MFCCs), linear filter banks (LFBs), among others. The analytics server 102 applies the speaker recognition engine to the audio features to extract an embedding as feature vector representing the set of features for the speaker. During an enrollment phase, the analytics server 102 ingests one or more enrollment audiovisual data samples to generate one or more corresponding enrollment audio embeddings. The machine-learning architecture algorithmically combines (e.g., averages) the enrollment audio embeddings to generate an enrolled voiceprint for an enrollee audiovisual profile, which the analytics server 102 stores into the analytics database 104.

During the deployment phase, the analytics server 102 ingests an inbound audiovisual data sample to extract an inbound audio embedding as an inbound voiceprint. In some cases, the analytics server 102 further receives the identity claim for a person associated with the inbound voiceprint. For speaker recognition, the machine-learning architecture generates a speaker similarity score representing a likelihood of similarity between the speaker in the enrolled voiceprint and the speaker of the inbound voiceprint. The analytics server 102 outputs one or more speaker-recognition similarity scores.

The speaker embedding representation may be generated by implementing, for example, a GMM-based system or neural network architecture (e.g., deep neural network, convolutional neural network). Example embodiments of the speaker recognition engine may be found in U.S. Pat. Nos. 9,824,692 and 10,141,009, and U.S. application Ser. No. 17/155,851, each of which is incorporated by reference in its entirety.

The analytics server 102 applies the speaker deepfake engine to the audio features to extract a speaker spoof embedding as a feature vector representing the set of features for artifacts of spoofed speech signals. During an optional enrollment phase, the analytics server 102 ingests one or more enrollment audiovisual data samples to generate one or more corresponding enrollment spoofprint embeddings. The machine-learning architecture algorithmically combines (e.g., averages) the enrollment spoofprint embeddings to generate an enrolled spoofprint for an enrollee audiovisual profile or other people, which the analytics server 102 stores into the analytics database 104.

During the deployment phase, the analytics server 102 ingests the inbound audiovisual data sample to extract an inbound spoof embedding as an inbound spoofprint. In some cases, the analytics server 102 further receives the identity claim for a person associated with the inbound spoofprint. For speaker deepfake detection, the machine-learning architecture generates a spoofprint similarity score representing a likelihood of that the inbound audiovisual data sample contains a deepfake of the speaker based upon the similarity between one or more preconfigured or enrolled spoofprints and the speaker of the inbound spoofprint. The analytics server 102 outputs one or more speaker-deepfake similarity or detection scores.

The audio deepfake detection engine may implement, for example, a neural network architecture or GMM-based architecture. Example embodiments of the speaker-deepfake detection engine may be found in U.S. Pat. No. 9,824,692 and U.S. application Ser. No. 17/155,851, each of which is incorporated by reference in its entirety.

Facial Engine

The machine-learning architecture includes layers defining one or more facial-embedding engines (sometimes referred to as "facial biometric engines" or "facial engines"), including a facial recognition engine and a facial deepfake detection engine.

The facial recognition engine extracts a facial embedding representation of the faces in frames of the audiovisual data. The facial recognition engine extracts a set of image features from the image data or segments of the image data. The features may include, for example, low-level image features, including (e.g., pixel vectors, linear binary pattern (LBPs), discrete cosine transforms (DCTs)), among others. The analytics server 102 applies the facial recognition engine to the image features to extract a facial embedding as feature vector representing the set of features for the person's face. During an enrollment phase, the analytics server 102 ingests one or more enrollment audiovisual data samples to generate one or more corresponding enrollment facial embeddings. The machine-learning architecture algorithmically combines (e.g., averages) the enrollment facial embeddings to generate an enrolled faceprint for an enrollee audiovisual profile, which the analytics server 102 stores into the analytics database 104.

During the deployment phase, the analytics server 102 ingests the inbound audiovisual data sample to extract an inbound facial embedding as an inbound faceprint. In some cases, the analytics server 102 further receives the identity claim for a person associated with the inbound faceprint. For facial recognition, the machine-learning architecture generates a facial similarity score representing a likelihood of similarity between the face in the enrolled faceprint and the face of the inbound faceprint. The analytics server 102 outputs one or more facial-recognition similarity scores.

The facial recognition engine may implement a neural network architecture (e.g., deep neural network), such as vggface. Example embodiments of the facial recognition engine may be found in Cao, et. al., "Vggface2: A Dataset for Recognising Faces across Pose and Age," IEEE, 13*th IEEE International Conference on Automatic Face & Gesture Recognition*, pp. 67-74 (2018), which is incorporated by reference in its entirety.

The analytics server 102 applies the facial deepfake engine to the image features to extract a facial spoof embedding as a feature vector representing the set of features for artifacts of spoofed facial images. During an optional enrollment phase, the analytics server 102 ingests one or more enrollment audiovisual data samples to generate one or more corresponding enrollment facial spoofprint embeddings. The machine-learning architecture algorithmically combines (e.g., averages) the enrollment facial spoofprint embeddings to generate an enrolled facial spoofprint for the enrollee audiovisual profile or other people, which the analytics server 102 stores into the analytics database 104.

During the deployment phase, the analytics server 102 ingests the inbound audiovisual data sample to extract an inbound facial spoof embedding as an inbound faceprint. In some cases, the analytics server 102 further receives the identity claim for the person associated with the inbound faceprint. For facial deepfake detection, the machine-learning architecture generates a faceprint similarity score representing a likelihood of that the inbound audiovisual data sample contains a deepfake of the face based upon the similarity between one or more preconfigured or enrolled faceprints and the face of the inbound faceprint. The analytics server 102 outputs one or more facial-deepfake similarity or detection scores.

The facial deepfake detection engine may implement, for example, a neural network architecture or GMM-based architecture, such as residual networks, Xception networks, and EffecientNets, among others.

Lip-Sync Estimation Engine

The machine-learning architecture includes layers defining a lip-sync estimation engine for determining whether variance between the speaker's audio signal and the speaker's facial gestures exceeds a synchronization threshold. The machine-learning architecture applies the lip-sync estimation engine on the audiovisual data or both the audio data and the image data. The lip-sync estimation engine analyzes the synchronization between the speaker's speech audio and the mouth or facial gestures of the particular speaker shown in the video of the audiovisual data. The lip-sync estimation engine generates a lip-sync score indicating a quality of synchronization between the speaker's mouth and the speech audio, thereby indicating a likelihood that the speaker originated the speech as seen and heard in the video.

In some implementations, the lip-sync estimation engine implements a signal processing technique; non-limiting examples may be found in F. Pitié, et al., "Assessment of Audio/Video Synchronisation in Streaming Media," IEEE, 2014 *Sixth International Workshop on Quality of Multimedia Experience* (*QoMEX*), pp. 171-176 (2014). In some implementations, the lip-sync estimation engine implements a deep learning algorithm or neural network architecture. Non-limiting examples of the deep learning approach may be found in J. S. Chung, et al., "Out of Time: Automated Lip Sync in the Wild," ACCV, *Workshop on Multi-view Lip-Reading* (2016), which is incorporated by reference in its entirety.

The lip-sync estimation engine analyzes the image data for the facial gestures or the mouth/lips of the face moving from snapshot to snapshot and phonemes from the segments of the audio data. For instance, the lip-sync estimation engine may extract lip-sync embeddings as feature vectors representing low-level features for the facial gestures, audio phonemes, and related timing data extracted from the audiovisual data. The lip-sync estimation engine focuses on movement of the mouth by extracting features for a rectangular region around the mouth. The lip-sync estimation engine uses the relevant pixels or image-map to create lip movement estimates or visual descriptors, and combines the movement estimates with audio features detected from the segment of audio data or audiovisual data. The lip-sync estimation engine determines a timing lag between the audio phonemes and the movement of the lips and/or facial gestures. The lip-sync estimation engine generates the lip-synch score indicating the quality of synchronization or likelihood that the audio and video aspects of the video are synchronized. In some cases, a binary classifier of the lip-sync estimation engine determines whether the audio and visual aspects of a segment or the video are in-synch or out-of-synch, based upon whether the lip-sync score satisfies the preconfigured synchronization score.

Biometric Scores, Score Fusion, and Classifiers

The machine-learning architecture includes layers for one or more scoring operations and/or score fusion operations. As mentioned, the machine-learning architecture generates the various biometric similarity scores for the claimed identity of a particular end-user using the inbound embeddings (e.g., inbound voiceprint, inbound faceprint, inbound speaker spoofprint, inbound facial spoofprint) extracted from the inbound audiovisual data as compared against the enrolled embeddings (e.g., enrolled voiceprint, enrolled faceprint, preconfigured speaker spoofprints, preconfigured facial spoofprints), such as the enrolled audiovisual profile of one or more enrolled identities that may include the audiovisual profile for the claimed identity. Given the inbound faceprint and inbound voiceprint of the claimed identity and the enrolled faceprint and the enrolled voiceprint of the claimed identity, the biometric scorer computes the mathematical similarity between the corresponding embeddings. The similarity scores may be, for example, a cosine similarity, output of layers defining probabilistic linear discriminant analysis (PLDA), output of layers defining a support vector machine (SVM), or output of layers defining an artificial neural network (ANN).

The machine-learning architecture may perform one or more fusion operations to generate a final output score for the particular audiovisual data. In some embodiments, the fusion operation includes score fusion that algorithmically combines the various scores previously generated speaker deepfake detection score, facial deepfake detection score, and biometric recognition similarity scores. The score fusion operation generates, for example, a final output score, a final audiovisual deepfake score, and/or a final audiovisual recognition score. The layers for the score fusion operations may be, for example, a simple rule-based model or a linear machine-learning model (e.g., logistic regression). The machine-learning architecture may further include one or more classifier models applied to the one or more final scores to classify between a "genuine" classification of the audiovisual data and a "spoof" classification (sometimes referred to as "deepfake" classification) for the audiovisual data. During the training phase, the analytics server 102 trains the classifier model to classify between the "genuine" and the "spoof" classifications according to labeled data in training audiovisual data.

In some embodiments, the fusion operation includes embedding-level fusion (sometimes referred to as "intermediate-level" fusion) to algorithmically combine the various embeddings. The speaker engine, facial engine, and/or the lip-sync estimation engine of the machine-learning architecture extracts and concatenates the embeddings extracted from the audiovisual data to calculate the one or more scores. For example, the machine-learning architecture extracts a joint embedding (e.g., joint inbound embedding, joint enrolled embedding) to generate one or more scores, and layers of a machine-learning classifier trained to classify between the "genuine" and the "spoof" classifications according to the joint embeddings. The classifier layers may implement linear discriminant analysis (LDA), probabilistic linear discriminant analysis (PLDA), support vector machine (SVM), or artificial neural network (ANN), among others.

In some embodiments, the fusion operation includes "feature-level" fusion. The analytics server 102 extracts the spectro-temporal features or other features from the segments of the audio data (e.g. mel frequency cepstral coefficients (MFCCs), linear filter banks (LFBs)) and the visual data (e.g., pixel vectors, linear binary pattern (LBPs), discrete cosine transforms (DCTs)). The machine-learning architecture then concatenates the features to determine one or more similarity scores. The machine-learning architecture includes layers of a machine-learning classifier trained to classify between the "genuine" and the "spoof" classifications according to embeddings extracted from the concatenated joint features.

Region of Interest Suggestion Engine

In some embodiments, the machine-learning architecture includes layers defining a region of interest (ROI) suggestion engine. If the analytics server 102 determines that the audiovisual data sample is not genuine, then the analytics server 102 applies the ROI suggestion engine. The ROI suggestion engine references the deepfake detection scores to identify a set of one or more trouble segments likely to contain speaker deepfake content and/or facial deepfake content. The ROI suggestion engine generates a notification for display at the end-user device 114 or admin device 103. The notification indicates the set of one or more trouble segments to the end-user or administrative user. In some implementations, to identify the trouble segments, the ROI suggestion engine compares the one or more segment-level deepfake scores against one or more corresponding preconfigured faked-segment thresholds. For example, the ROI suggestion engine determines that a particular segment likely contains speaker deepfake content when the speaker-deepfake detection score for the particular segment fails to satisfy the speaker faked-segment threshold. In some implementations, the ROI suggestion engine may perform additional or alternative operations (e.g., score smoothing) for detecting trouble segments.

The analytics database 104 or other database of the system 100 may contain any number of corpora of training audiovisual data samples, training audio signals, or training image data and accessible to the analytics server 102 via the one or more networks 108. In some embodiments, the analytics server 102 employs supervised training to train the various layers of the machine-learning architecture, where the analytics database 104 includes labels associated with the training audiovisual data sample that indicate expected features, embeddings, or classifications for the particular training audiovisual data. The analytics server 102 adjusts the weights or hyper-parameters for the machine-learning architecture according to one or more loss layers during training. The loss layers output a level of error representing distances between the expected outputs (e.g., excepted features, expected embeddings, expected classifications) indicated by the labels and corresponding predicted outputs (e.g., predicted features, predicted embeddings, predicted classifications) generated by the machine-learning architecture. The analytics server 102 fixes and stores the hyper-parameters or weights into the analytics database 104 in response to determining that the level of error satisfies a training error threshold.

The analytics database 104 may further store any number of enrollment embeddings for audiovisual profiles. The analytics server 102 may generate audiovisual profiles for particular enrollee-users of the particular service. In some cases, the analytics server 102 generates audiovisual profiles for celebrities or other high-profile people.

The admin device 103 or other computing device of the system 100 executes software programming and includes a graphical user interface allowing personnel of the analytics system 101 to perform various administrative tasks, such as configuring the analytics server 102, or user-prompted analytics operations executed by the analytics server 102. The admin device 103 may be any computing device comprising a processor and software, and capable of performing the various tasks and processes described herein. Non-limiting examples of the admin device 103 may include a server, personal computer, laptop computer, tablet computer, or the like. In operation, the administrative user employs the admin device 103 to configure the operations of the various components of the system 100 and to issue queries and instructions to such components.

In some cases, the analytics server 102 or other server of the system 100 transmits the outputted results generated by the machine-learning architecture to the admin device 103. The graphical user interface of the admin device 103 or other computing device displays some or all of the outputted results data, such as notifications indicating that the audiovisual data of the particular communication event session contains genuine or spoofed data or one or more scores generated by the components of the machine-learning architecture.

Components of a System Performing Deepfake Detection

Figure 2:
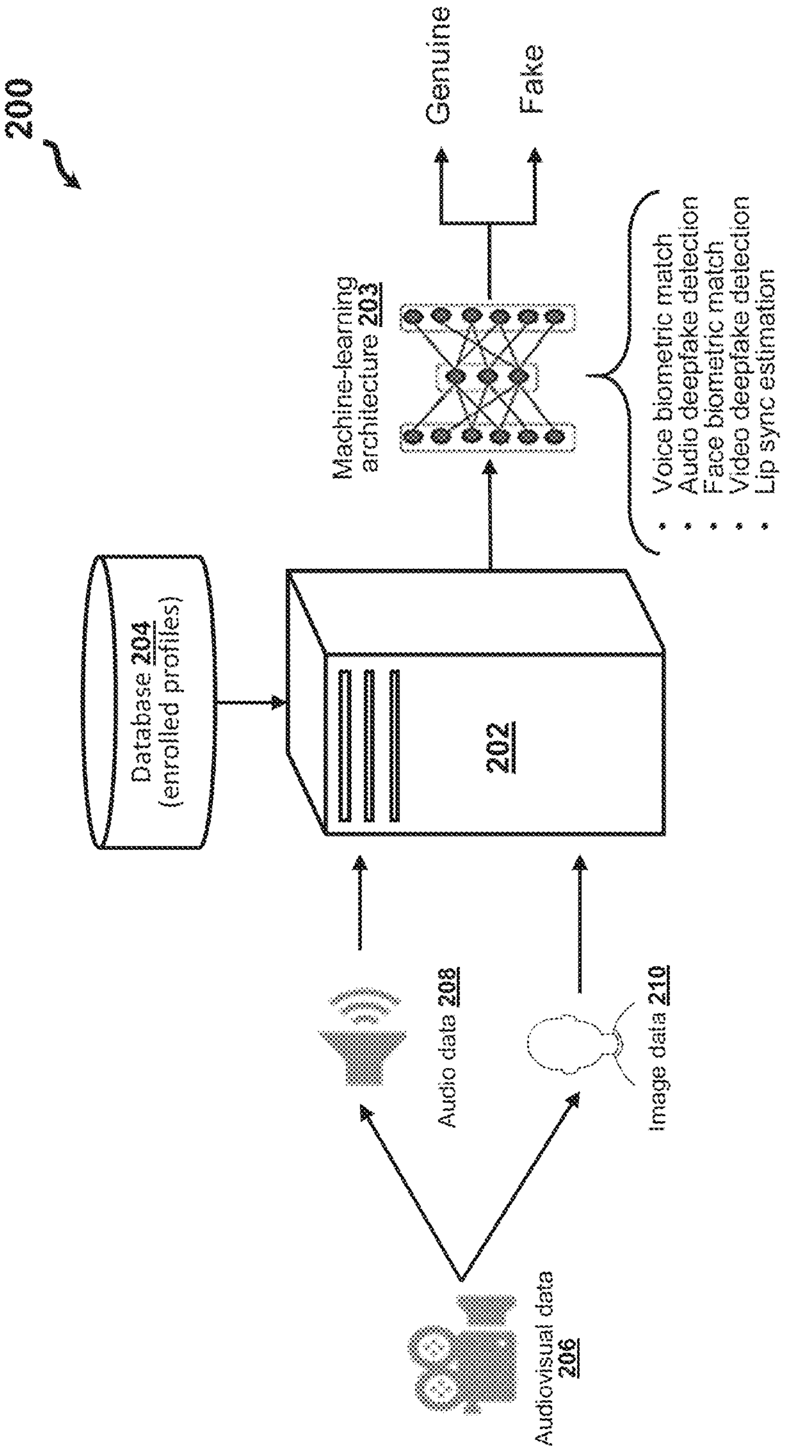
FIG. 2 is a diagram showing dataflow among components of a system performing identity recognition and deepfake detection operations.

FIG. 2 is a diagram showing dataflow among components of a system 200 performing person recognition and deepfake detection operations. A server 202 (or other computing device) applies layers and operations of one or more machine-learning architectures 203 to an enrolled audiovisual profile for a target identity of a person and audiovisual data 206 associated with a claimed identity as indicated by one or more inputs from an end-user device. The server 202 determines whether the claimed identity is in the audiovisual data 206 by executing speaker recognition and facial recognition operations. The server 202 further determines whether the claimed identity is genuine or spoofed by executing deepfake detection and/or lip-sync estimation operations of the machine-learning architecture 203.

The system 200 includes the server 202 comprising software configured to execute the layers and operations of the one or more machine-learning architectures 203. The system 200 further includes a database 204 configured to store one or more enrolled profiles. In operation, the server 202 receives the audiovisual data 206 as a media data file or data stream, where the audiovisual data 206 includes a particular audiovisual media format (e.g., MP4, MOV). The audiovisual data 206 includes audio data 208 containing and audio signal of a speaker's voice and image data 210 containing a video or one or more images of a person. The server 202 further receives an end-user input or other data indicating the claimed identity of the particular person purportedly speaking and shown in the audiovisual data 206.

During a training phase, the server 202 receives training audiovisual data 206 and applies the machine-learning architecture 203 on the training audiovisual data 206 to train the machine-learning architecture 203. During an enrollment phase, the server 202 receives enrollment audiovisual data 206 and applies the machine-learning architecture 203 on the enrollment audiovisual data 206 to develop the machine-learning architecture 203 for particular people (e.g. enrolled users of a service, celebrities). The server 202 generates enrolled profiles containing biometric feature embeddings representing aspects of the enrollee-person, such as an enrolled voiceprint and enrolled faceprint. The server 202 stores the profile data into the database 204, which the server 202 references during a deployment phase.

In the deployment phase, the server 202 receives inbound audiovisual data 206 and applies the machine-learning architecture 203 on the inbound audiovisual data 206 to determine that the inbound audiovisual data 206 is likely either a genuine video of the person or a deepfake video of the person. The server 202 generates an inbound profile containing the biometric feature embeddings representing aspects of one or more people (e.g., speaker's voice, person's face), such as an inbound voiceprint and inbound faceprint. In some implementations, the server 202 generates one or more scores indicating similarities between the enrolled profile (e.g., enrolled voiceprint, enrolled faceprint) for an enrolled person and the inbound profile (e.g., inbound voiceprint, inbound faceprint).

The server 202 may parse the audiovisual data 206 into segments of the audio data 208 and image data 210. The server 202 may convert the data format of these parsed segments into different data formats. For example, the server 202 parses the audio data 208 of the enrollment audiovisual data 206 into a set of one or more one-second audio segments, and parses the image data 210 of the enrollment audiovisual data 306 into snapshot pictures at each second of the audiovisual data 206. In this example, the server generates the set of audio data 208 in an audio format (e.g., mp3, wav) and the set of image data 210 in an image format (e.g., jpg, gif).

The server 202 applies machine-learning architecture 203 on the audiovisual data 206 to generate one or more scores. The server 202 references the scores to determine a likelihood that the audiovisual data 206 contains a genuine video of the person or deepfake of the person. The machine-learning architecture 203 includes layers defining various components, including a speaker recognition engine, a speaker deepfake engine, a facial recognition engine, a facial deepfake engine, and, in some embodiments, a lip-sync estimation engine. In operation, the server 202 extracts a set of audio features from the audio data 208 and a set of visual features from the image data 210. The components of the machine-learning architecture 203 extract embeddings, where each embedding includes a vector representing a particular set of features extracted from a particular segment of the audio data 208 or the image data 210.

The machine-learning architecture 203 includes speaker engines, including a speaker recognition engine and speaker-deepfake detection engine. The speaker recognition engine of the machine-learning architecture 203 extracts a speaker voiceprint (e.g., training voiceprint, enrollment voiceprint, inbound voiceprint) based on features and embeddings for speaker recognition as extracted from the audio data 208. The speaker-deepfake detection engine of the machine-learning architecture 203 extracts a speaker spoofprint (e.g., training speaker spoofprint, enrollment speaker spoofprint, inbound speaker spoofprint) based on features and embeddings for speaker deepfake detection as extracted from the audio data 208. The speaker engine outputs one or more similarity scores for speaker recognition and speaker deepfake detection.

The machine-learning architecture 203 includes facial engines, including a facial recognition engine and facial-deepfake detection engine. The facial recognition engine of the machine-learning architecture 203 extracts a faceprint (e.g., training faceprint, enrollment faceprint, inbound faceprint) based on features and embeddings for facial recognition as extracted from the image data 210. The facial deepfake engine of the machine-learning architecture 203 extracts a facial spoofprint (e.g., training facial spoofprint, enrollment facial spoofprint, inbound facial spoofprint) based on features and embeddings for facial deepfake detection as extracted from the image data 210. The facial engine outputs one or more similarity scores for facial recognition and facial deepfake detection.

The lip-sync estimation engine of the machine-learning architecture 203 generates a lip-sync score. The lip-sync estimation engine analyzes the image data for the facial gestures or the mouth/lips of the face moving from snapshot to snapshot and phonemes from the segments of the audiovisual data 206. For instance, the lip-sync estimation engine may extract lip-sync embeddings as feature vectors representing low-level features for the facial gestures, audio phonemes, and related timing data extracted from the audiovisual data 206. The lip-sync estimation engine focuses on movement of the mouth by extracting features for a rectangular region around the mouth in the image data 210 or audiovisual data 206. The lip-sync estimation engine uses the relevant pixels or image-map to create lip movement estimates or visual descriptors, and combines the movement estimates with audio features detected from the segment of audio data 208 or audiovisual data 206. The lip-sync estimation engine determines a timing lag between the audio phonemes and the movement of the lips and/or facial gestures. The lip-sync estimation engine generates the lip-synch score indicating the quality of synchronization or likelihood that the audio and video aspects of the video are synchronized.

The machine-learning architecture 203 includes layers for one or more scoring operations and/or score fusion operations. The score fusion layers output one or more final output scores, indicating a high/low likelihood of identity recognition (e.g., speaker recognition, facial recognition), a high/low likelihood of deepfake detection (e.g., speaker deepfake, facial deepfake), and high/low lip-sync quality. The machine-learning architecture 203 includes one or more classification layers trained to classify the audiovisual data 206 as likely either genuine or fake.

Figure 3:
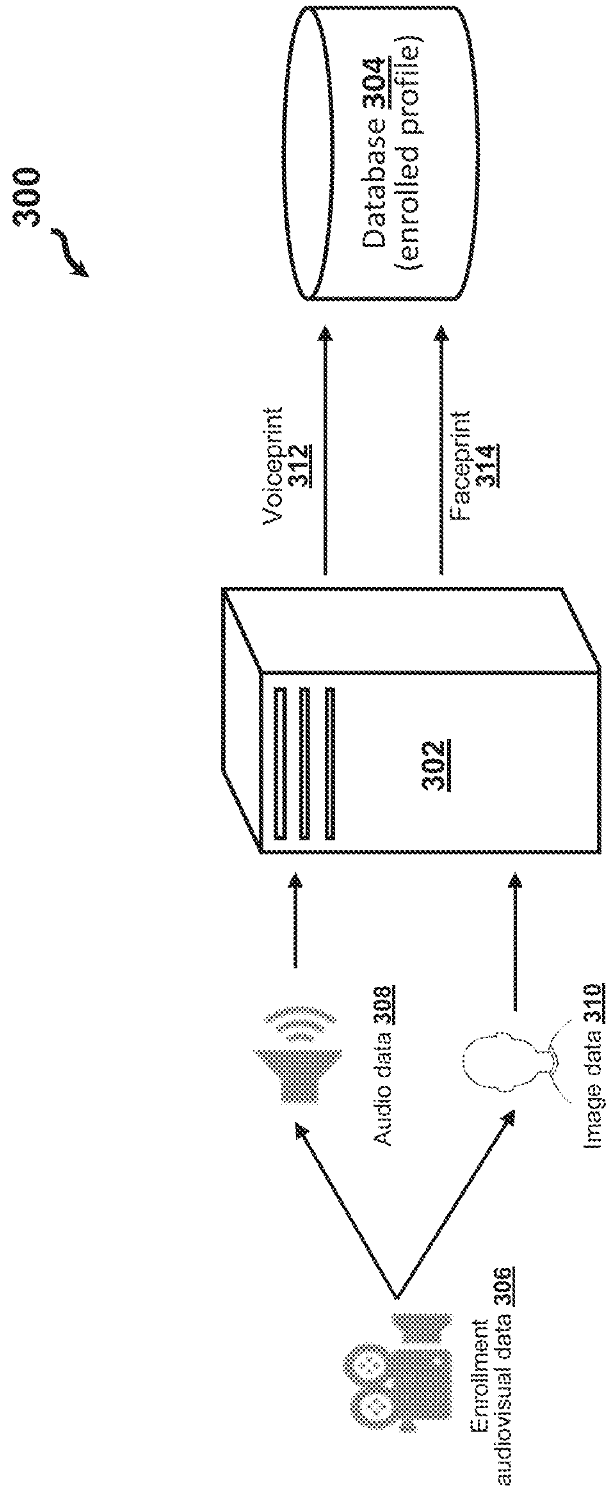
FIG. 3 is a diagram showing dataflow among components of a system performing enrollment operations to build an enrolled audiovisual profile for a particular person.

FIG. 3 is a diagram showing dataflow among components of a system 300 performing enrollment operations to build an enrolled audiovisual profile. The system 300 includes a server 302 and a database 304. The server 302 receives enrollment audiovisual data 306 as a media data file or data stream, where the enrollment audiovisual data 306 includes a particular audiovisual media format (e.g., mp4, mov). The machine-learning architecture includes layers defining a speaker engine and an image engine. The server 302 applies the components of the machine-learning architecture on the enrollment audiovisual data 306 to generate an enrolled profile for a particular person, where the enrolled profile includes an enrolled voiceprint 312 and an enrolled faceprint 314. The server 302 applies the speaker engine on the enrollment audio data 308 to generate the enrolled voiceprint 312, and applies the image engine on the enrollment image data 310 to generate the enrolled faceprint 314.

In some cases, the server 302 may receive enrollment audio data 308 and/or enrollment image data 310 distinct from the enrollment audiovisual data 306. In these cases, the enrollment audio data 308 includes a particular audio format (e.g., mp3, wav) or image format (e.g., jpg, gif). The server 302 may parse the enrollment audiovisual data 306 into segments of the enrollment audio data 308 and enrollment image data 310. The server 302 may convert the data format of these parsed segments into different data formats. For example, the server 302 parses the audio data of the enrollment audiovisual data 306 into a set of one or more one-second audio segments, and parses the image data of the enrollment audiovisual data 306 into snapshot pictures at each second of the enrollment audiovisual data 306. In this example, the server generates the set of enrollment audio data 308 in an audio format and the set of enrollment image data 310 in an image format.

The server 302 extracts a set of features from the enrollment audio data 308 and enrollment image data 310 and a set of features from the enrollment image data 310. The speaker engine extracts a speaker embedding as a vector representing the features of the particular segment of the enrollment audio data 308. The speaker engine algorithmically combines the speaker embeddings (e.g., averages) to extract the enrolled voiceprint 312. Similarly, the image engine extracts an image embedding as a vector representing the features of the particular enrollment image data 310. The image engine algorithmically combines the image embeddings to extract the enrolled faceprint 314. The server 302 stores the enrolled voiceprint 312 and enrolled faceprint 314 into the database 304, which the server 302 references later during a deployment phase.

Example Process Operations

Figure 4:
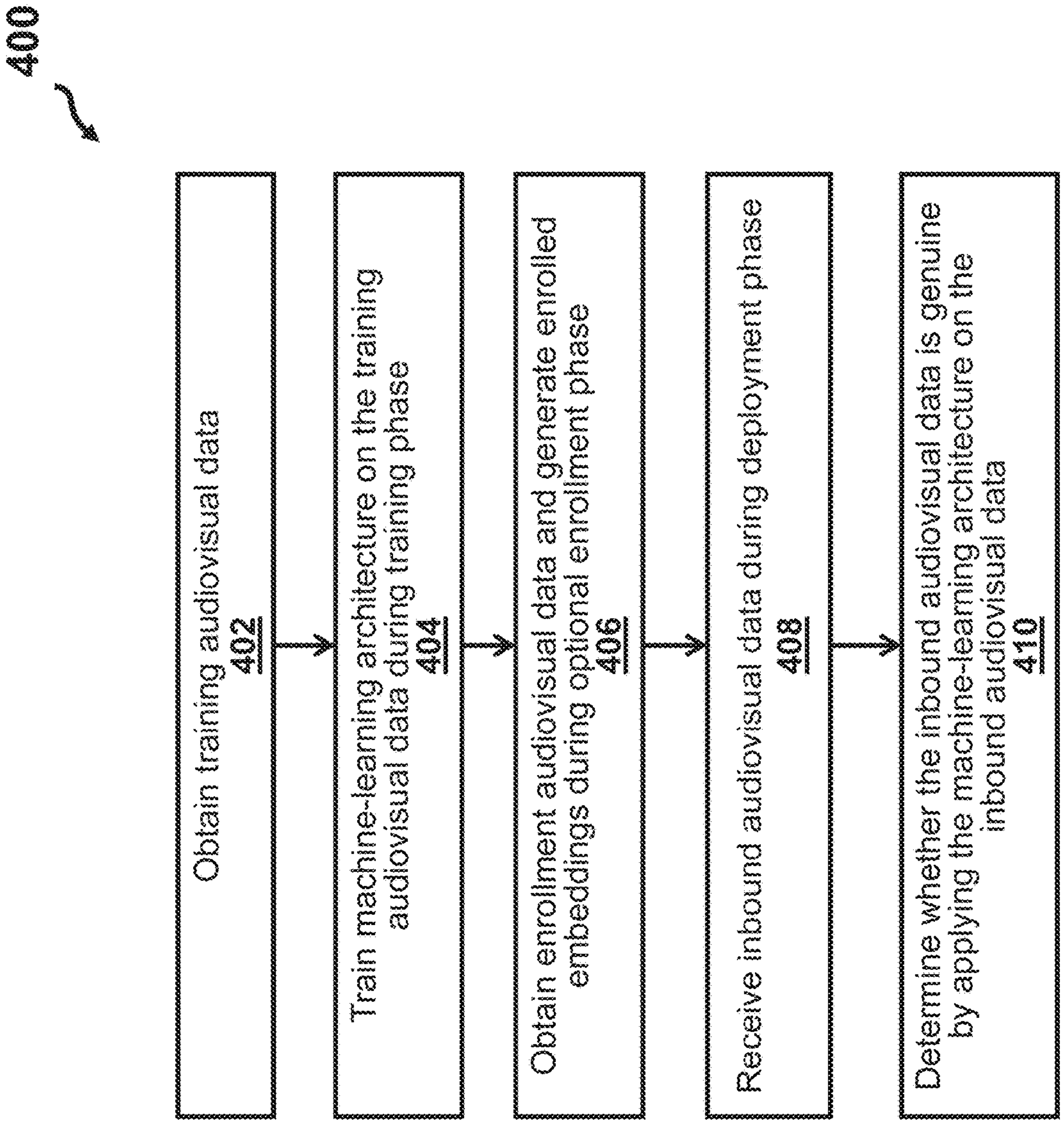
FIG. 4 shows execution steps of a method for implementing one or more machine-learning architectures for deepfake detection and identity recognition.

FIG. 4 shows execution steps of a method 400 for implementing one or more machine-learning architectures for deepfake detection (e.g., speaker spoof, facial spoof) and identity recognition (e.g., speaker recognition, facial recognition) using various biometrics. Embodiments may include additional, fewer, or different operations than those described in the method 400. A server performs the steps of the method 400 by executing machine-readable software code that includes the one or more machine-learning architectures, though it should be appreciated that any number of computing devices and/or processors may perform the various operations of the method 400.

In step 402, the server obtains training audiovisual data during the training phase, including training image data and training audio data for particular people. During the training phase, the server receives training audiovisual data (e.g., training audiovisual data samples) or generates various simulated audiovisual data samples, which may include degraded or mixed copies of training audiovisual data, training image data, or training audio data.

The server or layers of the machine-learning architecture may perform various pre-processing operations on input audiovisual data (e.g., training audiovisual data, enrollment audiovisual data, inbound audiovisual data), including audio data (e.g., speaker audio signal) and visual data (e.g., facial image). These pre-processing operations may include, for example, extracting low-level features from the speaker audio signals or visual image data and transforming these features into various alternative representations of the features (e.g., transforming the audio data from a time-domain representation into a frequency-domain representation) by performing Short-time Fourier Transforms (SFT), Fast Fourier Transforms (FFT), or another transformation operation. The pre-processing operations may also include parsing the audio signal or visual data into frames or sub-frames, and performing various normalization or scaling operations. Optionally, the server performs any number of pre-processing operations before feeding the audiovisual data into the layers of the machine-learning architecture. The server may perform the various pre-processing operations in one or more of the operational phases, though the particular pre-processing operations performed may vary across the operational phases. The server may perform the various pre-processing operations separately from the machine-learning architecture or as in-network layer of the machine-learning architecture.

The server or layers of the machine-learning architecture may perform various augmentation operations on the audiovisual data for training or enrollment purposes. The augmentation operations generate various types of distortion or degradation for the input audio signal, such that the resulting audio signals are ingested by, for example, the convolutional operations that generate the feature vectors. The server may perform the various augmentation operations as separate operations from the neural network architecture or as in-network augmentation layers. The server may perform the various augmentation operations in one or more of the operational phases, though the particular augmentation operations performed may vary across the operational phases.

In step 404, the server trains the machine-learning architecture by applying the layers of the machine-learning architecture on the training audiovisual data. The server applies layers of the machine-learning architecture to generate predicted outputs according to the operational layers of the particular component of the machine-learning architecture. Loss layers or another function of the machine-learning architectures determine a level of error (e.g., one or more similarities, distances) between the predicted output and labels or other data indicating the expected output. The loss layers or another aspect of the machine-learning architecture adjusts the hyper-parameters until the level of error for the predicted outputs (e.g., predicted embeddings, predicted scores, predicted classification) satisfy a threshold level or error with respect to expected outputs (e.g., expected embeddings, expected scores, expected classification). The server then stores the hyper-parameters, weights, or other terms of the particular machine-learning architecture into a database, thereby "fixing" the particular component of the machine-learning architecture and one or more models.

In step 406, the server places the neural network into an optional enrollment operational phase, and obtains enrollment audiovisual data to generate enrollment embeddings for an enrolled profile. The server applies the layers of the machine-learning architecture on the enrollment audiovisual data to generate the enrollment embeddings for the enrollment audiovisual profile for a particular person's profile. The server receives enrollment audiovisual data samples for the enrollee and applies the machine-learning architecture to generate the various enrollment feature vectors, including, for example, a speaker spoofprint, enrollee voiceprint, a facial spoofprint, and an enrollment faceprint. The server may enable and/or disable certain layers of the machine-learning architecture during the enrollment phase. For instance, the server typically enables and applies each of the layers during the enrollment phase, though in some implementations the server may disable certain the classification layers.

When extracting a particular embedding (e.g., voiceprint, faceprint, spoofprint(s)) for the enrollee, the machine-learning architecture generates a set of enrollee embeddings as feature vectors based on the corresponding types of features related to the particular type of embedding. The machine-learning architecture then algorithmically combines the corresponding types of embeddings to generate the voiceprint, faceprint, or speaker/facial sproofprint. The server stores each enrollee embedding into a non-transitory storage medium of the database.

In step 408, the server places the neural network architecture into a deployment phase, and receives inbound audiovisual data. The server parses the inbound audiovisual data into segments and extracts the low-level features from the segments. The server then extracts the various types of embeddings (e.g., inbound voiceprint, inbound faceprint, inbound spoofprint(s)) associated with a particular person for the inbound audiovisual data. In some cases, the server receives data inputs containing an identity claim that indicates the particular person.

In step 410, the server determines whether the inbound audiovisual data is genuine by applying the machine-learning architecture on the features of the inbound audiovisual data. The machine-learning architecture generates one or more similarity scores based on the similarities or differences between the inbound embeddings and the corresponding enrolled embeddings, which in some cases are the enrolled embeddings associated with the person of the identity claim.

As an example, the machine-learning architecture extracts the inbound voiceprint and outputs a similarity score indicating the similarity between the inbound voiceprint and the enrollee voiceprint for speaker recognition. Likewise, for facial recognition, the machine-learning architecture extracts the inbound faceprint and the enrolled faceprint and outputs the similarity score indicating the distance between the inbound faceprint and the enrolled faceprint. A larger distance may indicate a lower degree of similarity and lower likelihood that the speaker or face of the inbound audiovisual data matches to the enrolled speaker's voice or face. In this example, the server identifies a match (or recognizes) the speaker or face as the enrollee when the similarity score satisfies a speaker or facial recognition threshold.

As another example, the neural network architecture extracts the inbound facial spoofprint and the inbound speaker spoofprint, and outputs similarity scores indicating the similarities between the inbound speaker/facial spoofprint and the corresponding enrolled speaker/facial spoofprint. A larger distance may indicate a lower likelihood that the inbound audiovisual is a spoof, due to lower/fewer similarities between the inbound speaker/facial spoofprint and the enrollee speaker/facial spoofprint. In this example, the server determines the speaker or face of the inbound audiovisual data is a deepfake when the similarity score satisfies a deepfake detection threshold.

In some embodiments, the machine-learning architecture includes one or more fusion operations that generate a combined similarity score using a speaker/facial similarity score (based on comparing the voiceprints) and the corresponding speaker/facial deepfake detection scores (based on comparing the spoofprints). The server generates the combined similarity score by summing or otherwise algorithmically combining the speaker/facial similarity score and the corresponding speaker/facial deepfake detection score. The server then determines whether the combined similarity score satisfies an authentication or verification threshold score. As discussed herein, the machine-learning architecture may implement additional or alternative score fusion operations for determining the various similarity scores and classifications.

Figure 5:
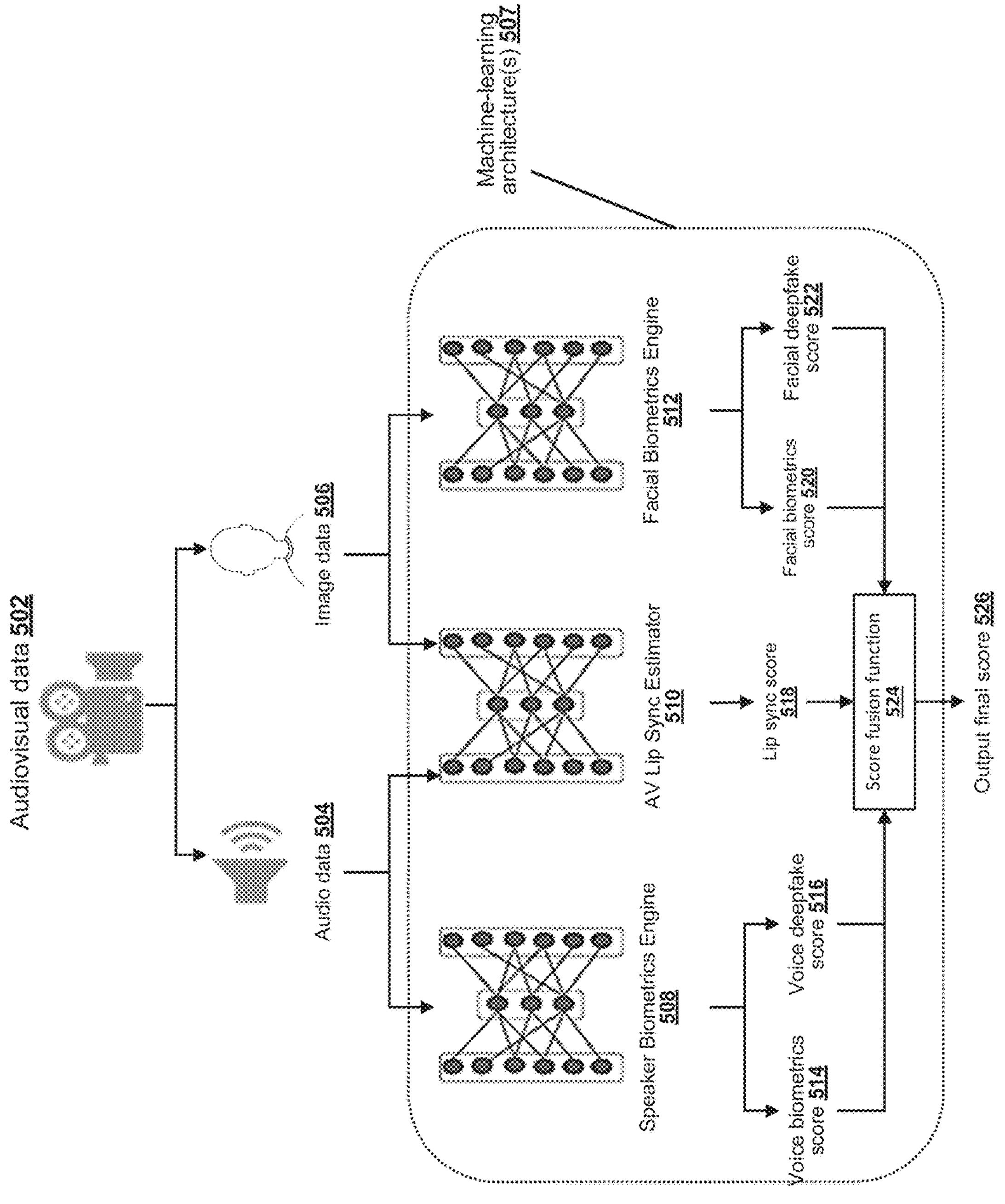
FIG. 5 shows data flow of components of a system for implementing a machine-learning architecture for deepfake detection and identity recognition, according to a score-level score fusion operation applied to various biometric measures.

FIG. 5 shows data flow of components of a system 500 for implementing one or more machine-learning architectures for deepfake detection (e.g., speaker deepfake spoof, facial deepfake spoof) and biometric recognition (e.g., speaker recognition, facial recognition), according to a score-level score fusion operation 524. A server or other computing device executes software of one or more machine-learning architectures 507 configured to perform the various the operations in the system 500.

The machine-learning architecture 507 receives audiovisual data 502 in the form of a computer file or data stream containing a video clip. The audiovisual data 502 includes audio data 504 containing a speaker's audio signal and image data 506 containing an image of a person's face. The machine-learning architecture 507 includes a speaker engine 508 that ingests the audio data 504, a facial engine 512 that ingests the image data 506, and a lip-sync estimation engine 510 that ingests the audiovisual data 502 and/or both the audio data 504 and the image data 506. The server parses the audio data 504, image data 506, and/or audiovisual data 502 into segments or frames of a given size (e.g., length, snapshot, data size). The server then extracts various types of low-level features from the corresponding portion of the audiovisual data 502, audio data 504, and/or image data 506. The server applies the machine-learning architecture 507 to the features extracted from the audiovisual data 502, audio data 504, and/or image data 506 and generates biometrics similarity scores (e.g., speaker similarity score 514, facial similarity score 520).

A speaker engine 508 of the machine-learning architecture 507 extracts a speaker recognition embedding (voiceprint) for certain features of the audio data 504 and extracts an audio deepfake embedding for certain features of the audio data 504. The speaker engine 508 references an enrolled voiceprint in a database to determine similarities between the input voiceprint and the enrolled voiceprint to generate a speaker biometric similarity score 514. The speaker engine 508 references one or more preconfigured speaker spoofprints in the database to determine similarities between the audio deepfake embedding and the preconfigured speaker spoofprints to generate a speaker deepfake score 516 for voice deepfake detection. The speaker engine 508 outputs the speaker similarity score 514 and the speaker deepfake score 516 to the score fusion operation 524.

A facial engine 512 of the machine-learning architecture 507 extracts a facial recognition embedding (faceprint) for certain features of the image data 506 and extracts a facial deepfake embedding for certain features of the image data 506. The facial engine 512 references an enrolled faceprint in the database to determine similarities between the input faceprint and the enrolled voiceprint to generate a facial biometric similarity score 520. The facial engine 512 references one or more preconfigured facial spoofprints in the database to determine similarities between the facial deepfake embedding and the preconfigured facial spoofprints to generate a facial deepfake score 522 for facial deepfake detection. The facial engine 512 outputs the facial similarity score 520 and the facial deepfake score 522 to the score fusion operation 524.

For segments of the audiovisual data 502, the audio data 504, and/or the image data 506, the lip-sync estimation engine 510 outputs a lip sync score 518. The lip-sync estimation engine 510 extracts features for lip/mouth gestures, phonemes, and/or timing data for certain segments of the video in the audiovisual data 502, and may extract a feature vector embedding representing the estimated lip-sync features for the given segments. The lip-sync score 518 indicates a likelihood that both speech and lip movement are in-sync or out-of-sync by a given degree. The lip-sync estimation engine 510 outputs the lip-sync score 518 to the score fusion function 524.

The score fusion function 524 of the method 500 algorithmically combines the scores 514, 516, 518, 520, 522 generated using the audiovisual data 502, audio data 504, and image data 506 to output a final audiovisual score 526. The machine-learning architecture 507 determines that the audiovisual data 502 is genuine or spoofed when the final output score 526 satisfies a particular threshold score. In some cases, the machine-learning architecture 507 includes classifier layers trained to classify the audiovisual data 502 as genuine or spoofed based upon the final output score 526 when represented as a vector.

Figure 6:
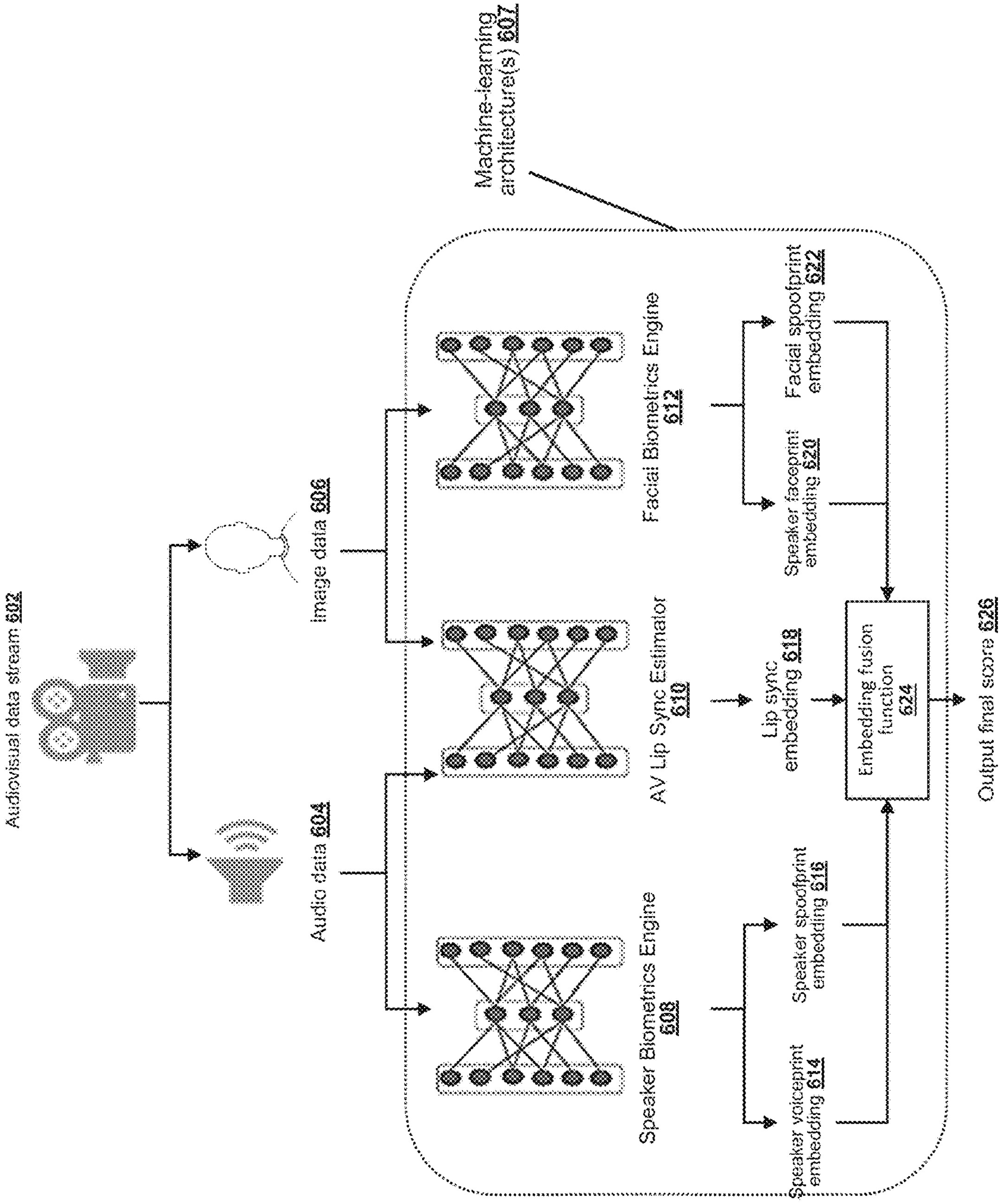
FIG. 6 shows data flow of components of a system for implementing a machine-learning architecture for deepfake detection and identity recognition, according to an embedding-level score fusion operation applied to various biometric measures.

FIG. 6 shows data flow of components of a system 600 for implementing one or more machine-learning architectures for deepfake detection (e.g., speaker spoof, facial spoof) and person recognition (e.g., speaker recognition, facial recognition), according to an embedding-level score fusion operation 624. A server or other computing device executes software of one or more machine-learning architectures 607 configured to perform the various the operations in the system 600.

The machine-learning architecture 607 receives audiovisual data 602 in the form of a computer file or data stream containing a video clip. The audiovisual data 602 includes audio data 604 containing a speaker's audio signal and image data 606 containing an image of a person's face. The machine-learning architecture 607 includes a speaker engine 608 that ingests the audio data 604, a facial engine 612 that ingests the image data 606, and a lip-sync estimation engine 610 that ingests the audiovisual data 602 and/or both the audio data 604 and the image data 606. The server parses the audio data 604, image data 606, and/or audiovisual data 602 into segments or frames of a given size (e.g., length, snapshot, data size). The server then extracts various types of low-level features from the corresponding portion of the audiovisual data 602, audio data 604, and/or image data 606. The server applies the machine-learning architecture 607 to the features extracted from the audiovisual data 602, audio data 604, and/or image data 606 and extracts various types of embeddings 614, 616, 618, 620, 622 using the corresponding types of features.

A speaker engine 608 of the machine-learning architecture 607 extracts a speaker recognition embedding 614 (voiceprint) for certain features of the audio data 604 and extracts an audio spoofprint embedding 616 for certain features of the audio data 604. The speaker engine 608 outputs the speaker voiceprint 614 and the speaker spoofprint 616 to the score fusion operation 624.

A facial engine 612 of the machine-learning architecture 607 extracts a facial recognition embedding 620 (faceprint) for certain features of the image data 606 and extracts a facial spoofprint embedding 622 for certain features of the image data 606. The facial engine 612 outputs the faceprint embedding 620 and the facial spoofprint 622 to the score fusion operation 624.

For segments of the audiovisual data 602, the audio data 604, and/or the image data 606, the lip-sync estimation engine 610 outputs a lip sync score 618. The lip-sync estimation engine 610 extracts features for lip/mouth gestures, phonemes, and/or timing data for certain segments of the video in the audiovisual data 602, and may extract a feature vector as an lip-sync embedding 618 representing the estimated lip-sync features for the given segments. The lip-sync estimation engine 610 outputs the lip-sync embedding 618 to the score fusion function 624.

The score fusion function 624 of the method 600 algorithmically combines (e.g., concatenates) the embeddings 614, 616, 618, 620, 622 to generate a joint embedding using the audiovisual data 602, audio data 604, and image data 606. The score fusion function 624 or other function of the machine-learning architecture 607 determines a joint similarity score (shown as final score 626) based upon the distances or similarities between the joint embedding for the audiovisual data 602 and an enrolled joint embedding stored in a database.

The machine-learning architecture 607 determines that the audiovisual data 602 is genuine or spoofed based on whether the final output score 626 satisfies a preconfigured threshold score. In some cases, the machine-learning architecture 607 includes classifier layers trained to classify the audiovisual data 602 as genuine or spoofed based upon the final output score 626 represented as a vector.

Figure 7:
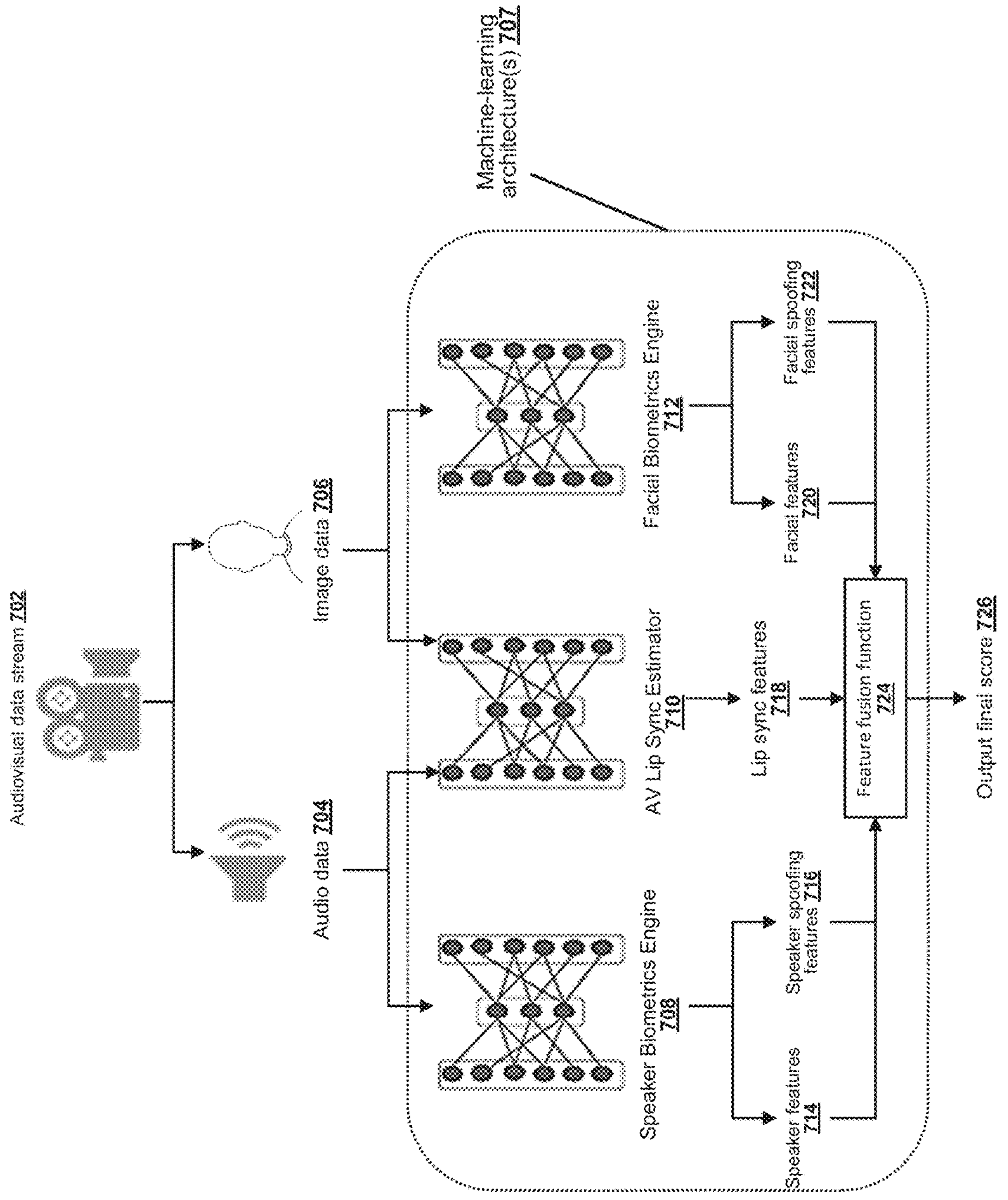
FIG. 7 shows data flow of components of a system for implementing a machine-learning architecture for deepfake detection and identity recognition, according to a feature-level score fusion operation applied to the various biometric measures.

FIG. 7 shows data flow of components of a system 700 for implementing one or more machine-learning architectures for deepfake detection (e.g., speaker spoof, facial spoof) and person recognition (e.g., speaker recognition, facial recognition), according to a feature-level score fusion operation 724. A server or other computing device executes software of one or more machine-learning architectures 707 configured to perform the various the operations in the system 700.

The machine-learning architecture 707 receives audiovisual data 702 in the form of a computer file or data stream containing a video clip. The audiovisual data 702 includes audio data 704 containing a speaker's audio signal and image data 706 containing an image of a person's face. The machine-learning architecture 707 includes a speaker engine 708 that ingests the audio data 704, a facial engine 712 that ingests the image data 706, and a lip-sync estimation engine 710 that ingests the audiovisual data 702 and/or both the audio data 704 and the image data 706. The server parses the audio data 704, image data 706, and/or audiovisual data 702 into segments or frames of a given size (e.g., length, snapshot, data size). The server then extracts various types of low-level features from the corresponding portion of the audiovisual data 702, audio data 704, and/or image data 706. The server applies the machine-learning architecture 707 and the feature-level score fusion function 724 to the various types of features 714, 716, 718, 720, 722 to extract one or more joint embeddings that the machine-learning architecture 707 compares against one or more corresponding enrolled joint embeddings stored in a database.

A speaker engine 708 of the machine-learning architecture 607 extracts certain low-level, speaker recognition features 714 and audio spoofprint features 716 for the audio data 704. The speaker engine 708 concatenates and outputs the speaker voiceprint features 714 and the speaker spoofprint features 716 to the score fusion operation 724.

A facial engine 712 of the machine-learning architecture 707 extracts certain low-level, facial recognition features 720 and facial spoofprint features 722 for the image data 706. The facial engine 712 concatenates and outputs the faceprint features 720 and the facial spoofprint features 722 to the score fusion operation 724.

For segments of the audiovisual data 702, the audio data 704, and/or the image data 706, the lip-sync estimation engine 710 extracts low-level lip-sync features 718 for lip/mouth gestures, phonemes, and/or timing data for certain segments of the video in the audiovisual data 702. The lip-sync estimation engine 710 outputs the lip-sync features 718 to the score fusion function 724.

The score fusion function 724 of the method 700 algorithmically combines (e.g., concatenates) the various types of features 714, 716, 718, 720, 722 to extracts a joint embedding using the audiovisual data 702, audio data 704, and image data 706. The score fusion function 724 determines a joint similarity score (shown as final score 726) based upon similarities between the joint embedding and an enrolled joint embedding in a database. The machine-learning architecture 707 determines that the audiovisual data 702 is genuine or spoofed based on whether the final output score 726 satisfies a preconfigured threshold score. In some cases, the machine-learning architecture 707 includes classifier layers trained to classify the audiovisual data 672 as genuine or spoofed based upon the final output score 726 represented as a vector.

Figure 8:
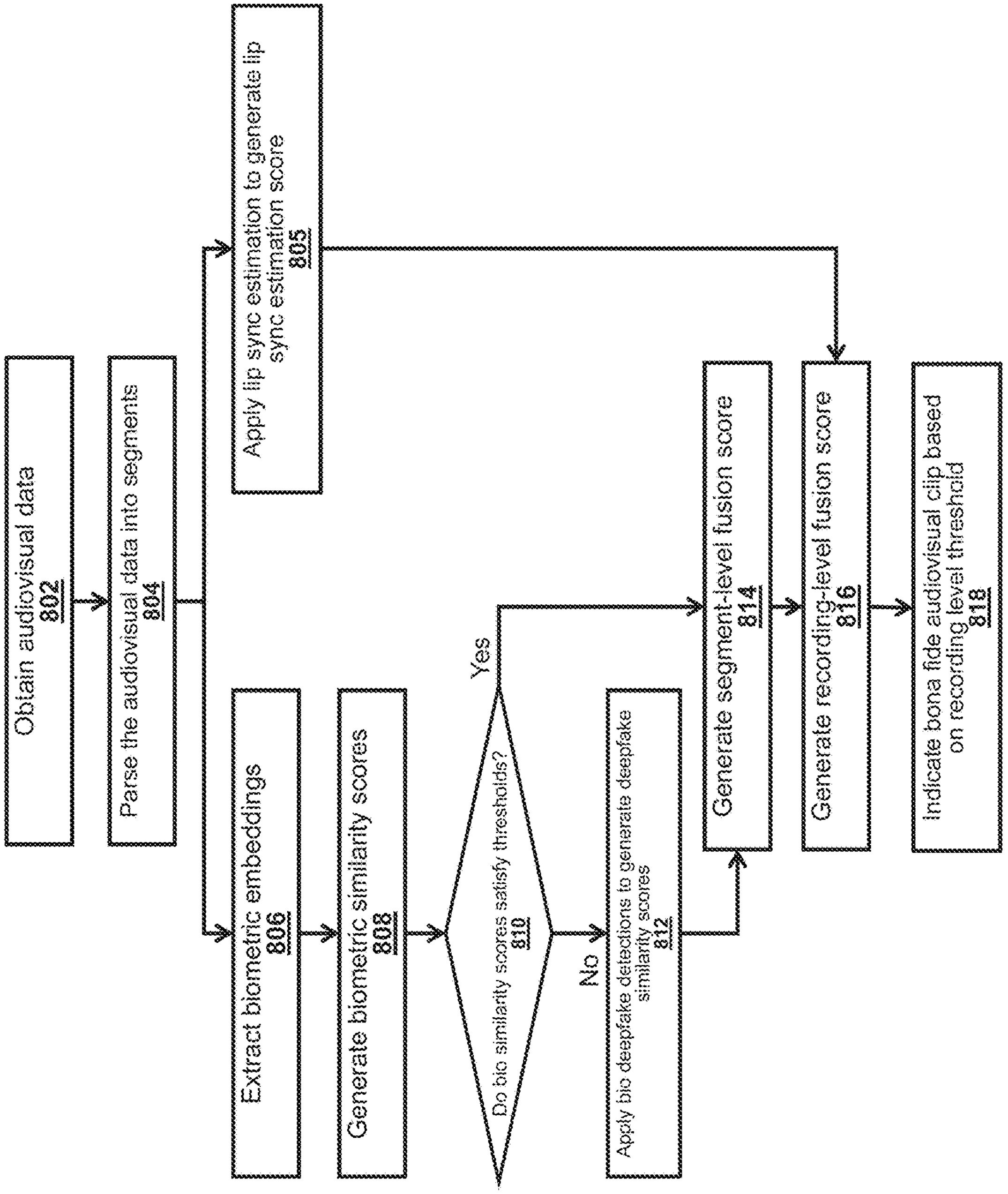
FIG. 8 shows execution steps of a method for implementing one or more machine-learning architectures for deepfake detection and identity recognition.

FIG. 8 shows execution steps of a method 800 for implementing one or more machine-learning architectures for deepfake detection (e.g., speaker spoof, facial spoof) and person recognition (e.g., speaker recognition, facial recognition), according to an embodiment. The machine-learning architecture includes layers for analyzing distinct audio and visual biometric embeddings (in steps 806-814) and layers for analyzing the audiovisual embedding as a lip sync estimation (in step 805). In the method 800, the server generates a segment-level fusion score using the audio embeddings and the visual embeddings (in step 814) for each segment, and generates a recording-level fusion score for segment-level score and the lip sync estimation score (in step 816) for most or all of the audiovisual data (e.g., video clip). Embodiments may implement score fusion operations at various levels of data (e.g., feature-level, embedding-level), and for various levels amounts data (e.g., full recordings, segments).

In step 802, the server obtains audiovisual data. In training or enrollment phases, the server may receive the training or enrollment audiovisual data samples from end-user devices, databases containing one or more corpora of training or enrollment audiovisual data, or third-party data sources hosting training or enrollment audiovisual data. In some cases, the server applies data augmentation operations on training audiovisual data to generate simulated audiovisual data for additional training audiovisual data. In a deployment phase, the server receives an inbound audiovisual data sample from an end-user device or third-party server hosting a software service that generates the inbound audiovisual data.

In step 804, the server parses the audiovisual data into segments or frames. The server applies the machine-learning architecture on the segments for the biometric embeddings (in steps 806-814) and applies the machine-learning architecture on some or all of the audiovisual data for the lip-sync estimation (in step 805). The server extracts various types of low-level features from the segments of the audiovisual data.

In step 805, for some or all of the segments, the server extracts lip-sync embeddings using the features of the particular segment. The server then applies a lip-sync estimation engine on the lip-sync embeddings of the segments to determine a lip-sync score.

In step 806, for some or all of the segments, the server extracts the biometric embeddings (e.g., voiceprint, faceprint) using the features of the particular segment. In step 808, the server generates a speaker recognition similarity score based upon the similarities between the speaker voiceprint and an enrolled speaker voiceprint. The server further generates a facial recognition similarity score based upon the similarities between the faceprint and an enrolled faceprint.

In optional step 810, the server determines whether both the speaker similarity score and the facial similarity score satisfy one or more corresponding recognition threshold scores. The server compares the speaker similarity score against a corresponding speaker recognition score, and compares the facial similarity score against a corresponding facial recognition score. The method 800 proceeds to step 812 if the server determines that the one or more biometric similarity scores fail to satisfy the corresponding recognition thresholds. Alternatively, the method 800 proceeds to step 814 if the server determines that the one or more biometric similarity scores satisfy the corresponding recognition thresholds.

Additionally or alternatively, in some embodiments the server fuses the types of biometric embeddings to generate joint biometric embeddings (in step 806), and generates a joint similarity score (in step 808). The server then determines whether the joint similarity score satisfies a joint recognition score by comparing an inbound joint embedding against an enrolled joint embedding.

The determination step 810 is optional. The server need not determine whether the one or more of the similarity scores satisfy corresponding recognition thresholds. In some embodiments, the server applies deepfake detection functions (in step 812) in each instance, thereby skipping optional step 810.

In step 812, when the server determines that the one or more of the biometric similarity scores fail to satisfy corresponding recognition thresholds (in step 810), then the server applies layers of the machine-learning architecture for speaker deepfake detection and facial deepfake detection. The machine-learning architecture extracts the deepfake detection embeddings (e.g., speaker spoofprint, facial spoofprint) using the low-level features extracted for each particular segment. The server generates a speaker deepfake detection score based upon the distances or similarities between the speaker spoofprint and one or more enrolled speaker spoofprints. The server further generates a facial deepfake detection score based upon the distances or similarities between the facial spoofprint and one or more enrolled facial spoofprints.

In step 814, the server applies a score fusion operation to generate a score-level fusion score using the scores (e.g., facial-recognition similarity score, speaker-recognition similarity score, speaker-deepfake detection score, facial-deepfake detection score) generated for each of the segments, thereby generating a segment-level score.

In step 816, the server applies a score fusion operation to generate a final fusion score using the segment-level score and the lip-sync estimation score generated by the server (in step 805), thereby generating a recording-level score. In the current embodiment, the one or more segment-level scores represent, for example, a final biometric assessment score, a deepfake likelihood, and a speaker/facial recognition likelihood. The lip-sync estimation score may be applied as a confidence adjustment or confidence check to determine whether the entire video contains genuine or deepfake content. The recording-level score may be computed as an average or median operation, or heuristic operation, such as the average of Top-N scores (e.g. N=10).

In step 818, the server generates a recording score for the audiovisual data. The server compares the recording score against a bona fide video threshold to determine whether the inbound audiovisual data contains genuine or spoofed data. The server generates a notification based on the final output, such as an indication of whether the audiovisual data is genuine or spoofed or an indication of the one or more scores generated by the machine-learning architecture, among other potential information. The server generates the notification according to any number of protocols and machine-readable software code, and configured for display on a user interface of the server or end-user device.

In some embodiments, the server executes layers of a region of interest (ROI) suggestion engine of the machine-learning architecture, when the audiovisual data fails to satisfy a bone fide video threshold. The ROI suggestion engine references the segment-level audio-visual deepfake score(s), and identifies a set of one or more trouble segments likely to contain speaker and/or facial deepfake content. The ROI suggestion engine may generate notification for display at the end-user device. The notification indicates the set of one or more trouble segments to the user. In some implementations, to identify the trouble segments, the ROI suggestion engine compares the one or more segment-level deepfake score(s) against one or more corresponding pre-configured faked-segment threshold(s). For example, the ROI suggestion engine determines that a particular segment likely contains speaker deepfake content when the speaker-deepfake detection score for the particular segment fails to satisfy a speaker faked-segment threshold. The ROI suggestion engine may perform additional or alternative operations (e.g., score smoothing) for detecting trouble segments.

Additional Example Embodiments

Detection of Malignant Deepfake Videos on Internet

In some embodiments, a website or could-based server, such as a social media site or forum website for exchange video clips, includes one or more servers executing the machine-learning architectures described herein. The host infrastructure includes a webserver, analytics server, and database continuing enrolled voiceprints and faceprints for identities.

In a first example, a machine-learning architecture detects deepfake videos posted to and hosted by social media platforms. An end-user provides enrollment audiovisual data samples to the analytics server to extract enrolled voiceprint and enrolled faceprint. The host system may further generate enrolled voiceprints and enrolled faceprints for celebrities, as well as enrolled speaker spoofprints and facial spoofprints. During deployment, for any given audiovisual data file or data stream on social media platforms, the analytics server applies the enrolled voiceprints, enrolled faceprints for celebrities, enrolled speaker spoofprints, and enrolled facial spoofprints. The analytics server determines whether the inbound audiovisual data contains deepfake contents of the particular celebrity. If the analytics server detects deepfake contents, the analytics server identifies trouble segments containing the deepfake content and generates a recommendation indicating the trouble segment.

In a second example, a machine-learning architecture detects deepfake illicit adult video content (typically for celebrities obtained without their consent) on internet forums. An end-user provides enrollment audiovisual data samples to the analytics server to extract enrolled voiceprint and enrolled faceprint. The host system may further generate enrolled voiceprints and enrolled faceprints for celebrities, as well as enrolled speaker spoofprints and facial spoofprints. During deployment, for any given video on internet forums, the analytics server downloads and analyzes the audiovisual data sample by layers for speaker and facial deepfake detection. The analytics server determines whether the downloaded audiovisual data contains deepfake contents of the particular celebrity. If the analytics server detects deepfake contents, the analytics server identifies trouble segments containing the deepfake content and generates a recommendation indicating the trouble segment.

In a third example, a host server or analytics server hosts a reputation service for celebrities on social media platforms, such as Twitter and Facebook. The analytics server generates enrolled voiceprints and enrolled faceprints for those celebrity-users who purchased this add-on service. For audiovisual data samples posted to and hosted by on social media platforms, the analytics server may detect whether the audiovisual data contains deepfake contents.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, attributes, or memory contents. Information, arguments, attributes, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:

generating, by a computer, a plurality of segments from audiovisual data;

for each segment of the plurality of segments of the audiovisual data, extracting, by the computer, a biometric embedding, a speaker spoofprint embedding, and a facial spoofprint embedding;

generating, by the computer, a similarity score using the biometric embedding of each segment from the audiovisual data, and a deepfake score using the speaker spoofprint embedding and the facial spoofprint embedding extracted of each segment from the audiovisual data; and generating, by the computer, a final output score indicating a likelihood that the audiovisual data is genuine using the similarity score of each segment and the deepfake score of each segment.

2. The method according to claim 1, further comprising:

obtaining, by a computer, an audiovisual data sample containing the audiovisual data; and identifying, by the computer, the audiovisual data sample as a genuine data sample in response to determining that the final output scores satisfies a threshold.

3. The method according to claim 1, further comprising identifying, by the computer, a trouble segment of the plurality of segments of the audiovisual data, the deepfake score of the trouble segment fails to satisfy a faked-segment threshold.

4. The method according to claim 3, further comprising generating, by the computer, a notification for display at user interface, the notification indicating one or more trouble segments of a region of interest of the audiovisual data.

5. The method according to claim 1, further comprising:

for each segment of the plurality of segments of the audiovisual data, extracting, by the computer, a lip-synch embedding; and generating, by the computer, a lip-sync score using the lip-sync embedding of each segment from the audiovisual data, wherein the computer generates the final output score of the audiovisual data further based upon the lip-sync score.

6. The method according to claim 1, wherein the biometric embedding includes at least one of a voiceprint embedding or a faceprint embedding.

7. The method according to claim 6, further comprising extracting, by the computer, the voiceprint embedding for the segment of the audiovisual sample using a speaker embedding extraction engine of a machine-learning architecture and based upon audio data of the audiovisual data.

8. The method according to claim 6, further comprising extracting, by the computer, the faceprint embedding for the segment of the audiovisual data using a faceprint embedding extraction engine of a machine-learning architecture and based upon visual media data of the audiovisual data.

9. The method according to claim 1, further comprising extracting, by the computer, the speaker spoofprint embedding for the segment of the audiovisual data using an audio spoofprint embedding extraction engine of a machine-learning architecture and based upon audio data of the audiovisual data.

10. The method according to claim 1, further comprising extracting, by a computer, the facial spoofprint embedding for the segment of the audiovisual data using a visual spoofprint embedding extraction engine of a machine-learning architecture and based upon visual media data of the audiovisual data.

11. A system comprising:

a computer comprising at least one processor configured to:

generate a plurality of segments from audiovisual data;

for each segment of the plurality of segments of the audiovisual data, extract a biometric embedding, a speaker spoofprint embedding, and a facial spoofprint embedding;

generate a similarity score using the biometric embedding of each segment from the audiovisual data, and a deepfake score using the speaker spoofprint embedding and the facial spoofprint embedding extracted of each segment from the audiovisual data; and generate a final output score indicating a likelihood that the audiovisual data is genuine using the similarity score of each segment and the deepfake score of each segment.

12. The system according to claim 11, wherein the computer is further configured to:

obtain an audiovisual data sample containing the audiovisual data; and identify the audiovisual data sample as a genuine data sample in response to determining that the final output scores satisfies a threshold.

13. The system according to claim 11, wherein the computer is further configured to identify a trouble segment of the plurality of segments of the audiovisual data, the deepfake score of the trouble segment fails to satisfy a faked-segment threshold.

14. The system according to claim 13, wherein the computer is further configured to generate a notification for display at user interface, the notification indicating one or more trouble segments of a region of interest of the audiovisual data.

15. The system according to claim 11, wherein the computer is further configured to:

for each segment of the plurality of segments of the audiovisual data, extract a lip-synch embedding; and generate a lip-sync score using the lip-sync embedding of each segment from the audiovisual data, and wherein the computer generates the final output score of the audiovisual data further based upon the lip-sync score.

16. The system according to claim 11, wherein the biometric embedding includes at least one of a voiceprint embedding or a faceprint embedding.

17. The system according to claim 16, wherein the computer is further configured to extract the voiceprint embedding for the segment of the audiovisual sample using a speaker embedding extraction engine of a machine-learning architecture and based upon audio data of the audiovisual data.

18. The system according to claim 16, wherein the computer is further configured to extract the faceprint embedding for the segment of the audiovisual data using a faceprint embedding extraction engine of a machine-learning architecture and based upon visual media data of the audiovisual data.

19. The system according to claim 11, wherein the computer is further configured to extract the speaker spoofprint embedding for the segment of the audiovisual data using an audio spoofprint embedding extraction engine of a machine-learning architecture and based upon audio data of the audiovisual data.

20. The system according to claim 11, wherein the computer is further configured to extract the facial spoofprint embedding for the segment of the audiovisual data using a visual spoofprint embedding extraction engine of a machine-learning architecture and based upon visual media data of the audiovisual data.

* * * * *